United States Patent
Hattori et al.

(10) Patent No.: US 12,264,238 B2
(45) Date of Patent: Apr. 1, 2025

(54) FLUORINATED COPOLYMER COMPOSITION, CROSSLINKED RUBBER AND METHOD FOR ITS PRODUCTION

(71) Applicant: AGC Inc., Tokyo (JP)

(72) Inventors: Yukiko Hattori, Tokyo (JP); Tsuyoshi Kawai, Tokyo (JP); Takeshi Yamada, Tokyo (JP); Takehiro Kose, Tokyo (JP)

(73) Assignee: AGC Inc., Tokyo (JP)

( * ) Notice: Subject to any disclaimer, the term of this patent is extended or adjusted under 35 U.S.C. 154(b) by 729 days.

(21) Appl. No.: 17/411,227

(22) Filed: Aug. 25, 2021

(65) Prior Publication Data
US 2021/0380794 A1 Dec. 9, 2021

Related U.S. Application Data

(63) Continuation of application No. PCT/JP2020/009647, filed on Mar. 6, 2020.

(30) Foreign Application Priority Data

| Mar. 8, 2019 | (JP) | 2019-042729 |
| Sep. 20, 2019 | (JP) | 2019-171600 |
| Oct. 23, 2019 | (JP) | 2019-192748 |

(51) Int. Cl.
| C08L 27/18 | (2006.01) |
| C08F 214/26 | (2006.01) |
| C08J 3/24 | (2006.01) |
| C08L 21/02 | (2006.01) |

(52) U.S. Cl.
CPC .......... C08L 27/18 (2013.01); C08F 214/262 (2013.01); C08J 3/246 (2013.01); C08L 21/02 (2013.01); C08J 2321/02 (2013.01); C08J 2327/18 (2013.01)

(58) Field of Classification Search
CPC ...... C08L 27/18; C08L 21/02; C08F 214/262; C08J 3/246; C08J 2327/18
See application file for complete search history.

(56) References Cited

U.S. PATENT DOCUMENTS

| 10,087,321 B2 * | 10/2018 | Terada | C08L 27/18 |
| 2012/0289641 A1 | 11/2012 | Hirano et al. | |
| 2016/0137828 A1 * | 5/2016 | Gurevich | C08K 5/16 |
| | | | 525/200 |

FOREIGN PATENT DOCUMENTS

| JP | 4374819 B2 | 12/2009 |
| JP | 2012-509975 A | 4/2012 |
| JP | 2017-503896 A | 2/2017 |
| WO | WO 2010/076876 A1 | 7/2010 |
| WO | WO 2016/193202 A1 | 12/2016 |

OTHER PUBLICATIONS

International Search Report issued May 26, 2020 in PCT/JP2020/009647, filed on Mar. 6, 2020, 2 pages.

* cited by examiner

*Primary Examiner* — Doris L Lee

(74) *Attorney, Agent, or Firm* — Oblon, McClelland, Maier & Neustadt, L.L.P.

(57) ABSTRACT

To provide a method for producing crosslinked rubber excellent in hardness and transparency.
The method for producing crosslinked rubber of the present invention is a method for producing crosslinked rubber, which comprises crosslinking a fluorinated copolymer in a composition comprising the fluorinated copolymer, a crosslinking agent and a crosslinking co-agent, wherein the fluorinated copolymer is a copolymer having units based on tetrafluoroethylene and units based on a perfluoro(alkyl vinyl ether), the content of the units based on tetrafluoroethylene is from 65 to 90 mol % to all units of the fluorinated copolymer, in the composition, the content of the crosslinking agent is from 0.03 to 0.7 part by mass to 100 parts by mass of the fluorinated copolymer, the content of the crosslinking co-agent is from 0.1 to 2.5 parts by mass to 100 parts by mass of the fluorinated copolymer, and the hardness is from 65 to 100.

12 Claims, No Drawings

FLUORINATED COPOLYMER COMPOSITION, CROSSLINKED RUBBER AND METHOD FOR ITS PRODUCTION

TECHNICAL FIELD

The present invention relates to a fluorinated copolymer composition, crosslinked rubber and a method for its production.

BACKGROUND ART

Crosslinked rubber having a fluorinated copolymer crosslinked (so-called fluororubber) is excellent in heat resistance, chemical resistance, oil resistance, weather resistance, etc. and thus is widely used in the fields of vehicles, ships, aircraft, general machinery, construction, etc., as sealing materials (e.g. O-rings, packing, oil seals, gaskets) and cushioning materials.

As a method of producing such crosslinked rubber, Patent Document 1 discloses a method of producing a molded product, including a process step of crosslinking and molding a crosslinkable fluorinated elastomer composition containing a filler satisfying specific properties and a crosslinkable fluorinated elastomer.

PRIOR ART DOCUMENT

Patent Document

Patent Document 1: Japanese Patent No. 4374819

DISCLOSURE OF INVENTION

Technical Problem

In recent years, there has been a demand for transparent crosslinked rubber in various fields. For example, in chemical plants, use of components made of transparent crosslinked rubber has such an advantage that visibility from the outside will be improved, whereby detection of abnormalities in manufacturing and maintenance of equipment will be easy.

Further, as one of the rubber properties required for crosslinked rubber, being excellent in hardness may be mentioned. With respect to these requirements, the present inventors evaluated crosslinked rubbers such as those described in Patent Document 1, and found that depending on the composition used in the production of the crosslinked rubber, there was room for improvement in transparency, although the hardness was excellent.

The present invention has been made in consideration of the above problem, and the object is to provide crosslinked rubber excellent in hardness and transparency, a method for its production, and a fluorinated copolymer composition.

SOLUTION TO PROBLEM

As a result of an extensive study on the above problem, the present inventors have found that crosslinked rubber excellent in hardness and transparency can be obtained if in crosslinked rubber obtainable by crosslinking a fluorinated copolymer in a composition comprising the fluorinated copolymer, a crosslinking agent and a crosslinking co-agent, the composition of the constituting units of the fluorinated copolymer is set within a specific range, and the contents of the crosslinking agent and the crosslinking co-agent in the composition are set within specific ranges to the content of the fluorinated copolymer, and thus have arrived at the present invention.

That is, the present inventors have found that the above problem can be solved by the following construction.

[1] A fluorinated copolymer composition comprising a fluorinated copolymer, a crosslinking agent and a crosslinking co-agent, characterized in that
the fluorinated copolymer is a copolymer having units based on tetrafluoroethylene and units based on a perfluoro (alkyl vinyl ether),
in the fluorinated copolymer, the content of the units based on tetrafluoroethylene is from 69 to 90 mol % to all units of the fluorinated copolymer,
the content of the crosslinking agent is from 0.03 to 0.7 part by mass to 100 parts by mass of the fluorinated copolymer, and
the content of the crosslinking co-agent is from 0.1 to 2.5 parts by mass to 100 parts by mass of the fluorinated copolymer.

[2] The fluorinated copolymer composition according to [1], wherein the fluorinated copolymer has iodine atoms, and
the mass ratio of the content of the iodine atoms to the content of the crosslinking agent is from 0.3 to 1.2.

[3] The fluorinated copolymer composition according to [1] or [2], wherein the fluorinated copolymer has iodine atoms, and
the mass ratio of the content of the iodine atoms to the content of the crosslinking co-agent is from 0.3 to 1.2.

[4] The fluorinated copolymer composition according to any one of [1] to [3], wherein
the mass ratio of the content of the crosslinking agent to the content of the crosslinking co-agent is from 0.4 to 7.

[5] The fluorinated copolymer composition according to any one of [1] to [4], wherein the total of the contents of the crosslinking agent and the crosslinking co-agent is at most 2.0 parts by mass to 100 parts by mass of the fluorinated copolymer.

[6] The fluorinated copolymer composition according to any one of [1] to [5], wherein the total of the contents of components other than the fluorinated copolymer is from 0.5 to 2.0 parts by mass to 100 parts by mass of the fluorinated copolymer.

[7] The fluorinated copolymer composition according to any one of [1] to [6], wherein the fluorinated copolymer further has units based on the following formula (2), and the content of the units based on the following formula (2) to all units of the fluorinated copolymer is from 0.03 to 0.5 mol %:

$$(CR^1R^2\!=\!CR^3)_aR^4 \qquad (2)$$

in the formula (2), $R^1$, $R^2$ and $R^3$ each independently represent a hydrogen atom, a fluorine atom or a methyl group, a represents an integer of from 2 to 6, and $R^4$ represents an a-valent $C_{1\text{-}10}$ perfluorohydrocarbon group or a group having an etheric oxygen atom at a terminal or between carbon-carbon atoms of said perfluorohydrocarbon group.

[8] Crosslinked rubber having the fluorinated copolymer in the fluorinated copolymer composition as defined in any one of [1] to [7] crosslinked.

[9] A method for producing crosslinked rubber characterized by crosslinking a fluorinated copolymer in a composition comprising the fluorinated copolymer, a crosslinking agent and a crosslinking co-agent, wherein the fluorinated copolymer is a copolymer having units based on tetrafluoroethylene and units based on a perfluoro (alkyl vinyl ether), in the fluorinated copolymer, the content of the units based on tetrafluoroethylene, is from 69 to 90 mol % to all units of the fluorinated copolymer, in the composition, the content of the crosslinking agent is from 0.03 to 0.7 part by mass to 100 parts by mass of the fluorinated copolymer, in the composition, the content of the crosslinking co-agent is from 0.1 to 2.5 parts by mass to 100 parts by mass of the fluorinated copolymer, and the hardness is from 65 to 100.

[10] The method for producing crosslinked rubber according to [9], wherein the total light transmittance of the crosslinked rubber is from 70 to 100%.

[11] The method for producing crosslinked rubber according to [9] or [10], wherein the fluorinated copolymer has iodine atoms, and in the composition, the mass ratio of the content of the iodine atoms to the content of the crosslinking agent is from 0.3 to 1.2.

[12] The method for producing crosslinked rubber according to any one of [9] to [11], wherein the fluorinated copolymer has iodine atoms, and in the composition, the mass ratio of the content of the iodine atoms to the content of the crosslinking co-agent is from 0.3 to 1.2.

[13] The method for producing crosslinked rubber according to any one of [9] to [12], wherein the mass ratio of the content of the crosslinking agent to the content of the crosslinking co-agent is from 0.4 to 7.

[14] The method for producing crosslinked rubber according to any one of [9] to [13], wherein in the composition, the total of the contents of the crosslinking agent and the crosslinking co-agent is at most 2.0 parts by mass to 100 parts by mass of the fluorinated copolymer.

[15] The method for producing crosslinked rubber according to any one of [9] to [14], wherein in the composition, the total of the contents of components other than the fluorinated copolymer is from 0.5 to 2.0 parts by mass to 100 parts by mass of the fluorinated copolymer.

Advantageous Effects of Invention

According to the present invention, it is possible to provide crosslinked rubber excellent in hardness and transparency, a method for its production, and a fluorinated copolymer composition.

DESCRIPTION OF EMBODIMENTS

The meanings of terms in the present invention are as follows.

A "unit" in a copolymer is a generic term for an atomic group directly formed by polymerization of a monomer and derived from a single molecule of the above monomer, and an atomic group obtained by chemical conversion of a portion of the above atomic group. "Units based on a monomer" may hereinafter be simply referred to also as "units".

"Rubber" means rubber showing properties defined by JIS K6200 (2008), and is distinguished from "resin".

The method for producing crosslinked rubber of the present invention is a method of obtaining crosslinked rubber by crosslinking a fluorinated copolymer in a composition (hereinafter referred to also as "fluorinated copolymer composition") comprising the fluorinated copolymer, a crosslinking agent and a crosslinking co-agent, wherein the fluorinated copolymer is a copolymer having tetrafluoroethylene units and perfluoro(alkyl vinyl ether) units; in the fluorinated copolymer, the content of units based on tetrafluoroethylene is from 69 to 90 mol % to all units of the fluorinated copolymer; in the fluorinated copolymer composition, the content of the crosslinking agent is from 0.03 to 0.7 part by mass to 100 parts by mass of the fluorinated copolymer; in the fluorinated copolymer composition, the content of the crosslinking co-agent is from 0.1 to 2.5 parts by mass to 100 parts by mass of the fluorinated copolymer; and the hardness is from 65 to 100.

The crosslinked rubber obtained by the above method for producing crosslinked rubber, is excellent in hardness and transparency. The details of the reason for this have not been clarified, but it is assumed to be due to the following reason.

As compared to e.g. a silicon resin, a fluorinated copolymer tends to undergo crystallization partially by crosslinking. Therefore, in the crosslinked rubber having the fluorinated copolymer crosslinked, as the number of crosslinked structures increases, microcrystalline portions tend to be formed, and as a result, the crosslinked rubber is considered to appear opaque.

Therefore, the inventor has found that by increasing the content of units based on tetrafluoroethylene in the fluorinated copolymer and by reducing the contents of the crosslinking agent and crosslinking co-agent to be used in crosslinking the fluorinated copolymer as compared to the conventional method, it is possible to obtain crosslinked rubber excellent in transparency while maintaining excellent hardness. That is, by reducing the contents of the crosslinking agent and crosslinking co-agent to such an extent that the properties of the rubber are not lost, it is assumed that the microcrystalline portions in the crosslinked rubber are reduced while retaining the crosslinking points to such an extent that the excellent hardness is maintained, and crosslinked rubber excellent in transparency is obtained.

[Fluorinated Copolymer Composition]

The fluorinated copolymer composition comprises a fluorinated copolymer, a crosslinking agent and a crosslinking co-agent.

<Fluorinated Copolymer>

The fluorinated copolymer is a copolymer having tetrafluoroethylene (hereinafter referred to also as "TFE") units and perfluoro(alkyl vinyl ether) (hereinafter referred to also as "PAVE") units.

As PAVE, a monomer represented by the following formula (1) is preferred.

$$CF_2=CF-O-R^{f1} \qquad (1)$$

In the formula (1), $R^{f1}$ represents a $C_{1-8}$ perfluoroalkyl group. The number of carbon atoms in $R^{f1}$ is preferably from 1 to 6, particularly preferably from 1 to 5.

Specific examples of PAVE may be perfluoro(methyl vinyl ether) (hereinafter referred to also as "PMVE"), perfluoro(ethyl vinyl ether) (hereinafter referred to also as "PEVE") and perfluoro(propyl vinyl ether) (hereinafter referred to also as "PPVE"), and among them, PMVE and PPVE are preferred.

The fluorinated copolymer may have units based on monomers other than TFE and PAVE, and examples thereof may be units based on a monomer represented by the following formula (2) (hereinafter referred to also as "formula (2) units"), units based on a monomer represented by the following formula (3) (hereinafter referred to also as "formula (3) units"), vinylidene fluoride (hereinafter referred to also as "VdF") units, hexafluoropropylene (hereinafter referred to also as "HFP") units, chlorotrifluoroethylene (hereinafter referred to also as "CTFE") units, and ethylene units, and among them, formula (2) units, formula (3) units and vinylidene fluoride (hereinafter referred to also as "VdF") units are preferred.

The formula (2) is as follows.

(CR$^1$CR$^2$=CR$^3$)$_a$R$^4$ (2)

In the formula (2), R$^1$, R$^2$ and R$^3$ each independently represent a hydrogen atom, a fluorine atom or a methyl group, a is an integer of from 2 to 6, and R$^4$ is an a-valent C$_{1-10}$ perfluorohydrocarbon group, or a group having an etheric oxygen atom at a terminal or between carbon-carbon atoms of the perfluorohydrocarbon group.

The plurality of R$^1$, the plurality of R$^2$, and the plurality of R$^3$ may be the same or different from each other, and it is particularly preferred that they are the same as each other.

a is preferably 2 or 3, and 2 is particularly preferred.

From the viewpoint of improving the polymerizability of monomers, and the crosslinking properties and heat resistance of the fluorinated copolymer, it is preferred that R$^1$, R$^2$ and R$^3$ are fluorine atoms or hydrogen atoms, and it is more preferred that all of R$^1$, R$^2$ and R$^3$ are fluorine atoms, or all of them are hydrogen atoms, and it is particularly preferred that all of R$^1$, R$^2$ and R$^3$ are fluorine atoms.

R$^4$ may be any of linear, branched or cyclic; linear or branched is preferred; linear is particularly preferred. The number of carbon atoms in R$^4$ is preferably from 2 to 8; more preferably from 3 to 7; further preferably from 3 to 6; and particularly preferably from 3 to 5. Further, the number of etheric oxygen atoms in R$^4$ is preferably from 0 to 3, and particularly preferably 1 or 2. 1 or 2 etheric oxygen atoms are preferably present at the terminals of the perfluoroalkylene group. When R$^4$ is within these preferred ranges, the hardness of crosslinked rubber will be superior, and the compression set at high temperatures will be smaller.

A specific example of the monomer represented by the formula (2) may be a compound in which a vinyl group or a trifluorovinyl group is bonded to each of the two terminals of a C$_{1-10}$ perfluoroalkylene group, either via or without via an etheric oxygen.

Specific examples of the monomer represented by the formula (2) may be CF$_2$=CFO(CF$_2$)$_2$OCF=CF$_2$, CF$_2$=CFO(CF$_2$)$_3$OCF=CF$_2$, CF$_2$=CFO(CF$_2$)$_4$OCF=CF$_2$, CF$_2$=CFO(CF$_2$)$_6$OCF=CF$_2$, CF$_2$=CFO(CF$_2$)$_8$OCF=CF$_2$, CH$_2$=CH(CF$_2$)$_6$CH=CH$_2$, CF$_2$=CFO(CF$_2$)$_2$OCF(CF$_3$)CF$_2$OCF=CF$_2$, CF$_2$=CFO(CF$_2$)$_2$O(CF(CF$_3$)CF$_2$O)$_2$CF=CF$_2$, CF$_2$=CFOCF$_2$O(CF$_2$CF$_2$O)$_2$CF=CF$_2$, CF$_2$=CFO(CF$_2$O)$_3$(CF(CF$_3$)CF$_2$O)$_2$CF=CF$_2$, CF$_2$=CFOCF$_2$CF(CF$_3$)O(CF$_2$)$_2$OCF(CF$_3$)CF$_2$OCF=CF$_2$, and CF$_2$=CFOCF$_2$CF$_2$O(CF$_2$O)$_2$CF$_2$CF$_2$OCF=CF$_2$ Preferred specific examples of the monomer represented by the formula (2) may be CF$_2$=CFO(CF$_2$)$_3$OCF=CF$_2$ (hereinafter referred to also as "C3DVE"), CF$_2$=CFO(CF$_2$)$_4$OCF=CF$_2$ (hereinafter referred to also as "C4DVE" or "PBDVE") and CH$_2$=CH(CF$_2$)$_6$CH=CH$_2$ (hereinafter referred to also as "C6DV").

When the fluorinated copolymer has at least one type of units based on these monomers, the polymerizability of the monomers and the crosslinking properties of the polymer will be excellent, and crosslinked rubber produced from the fluorinated copolymer will be superior in hardness, and the compression set at high temperatures will be smaller.

When the monomer represented by the formula (2) is copolymerized, some of polymerizable double bonds at terminals of the monomer represented by the formula (2) react during the polymerization, whereby a fluorinated copolymer having a branched chain will be obtained.

The formula (3) is as follows.

CF$_2$=CF—O—R$^{f2}$ (3)

In the formula (3), R$^{f2}$ represents a C$_{1-8}$ perfluoroalkyl group containing an etheric oxygen atom. The number of carbon atoms in R$^{f2}$ is preferably from 1 to 6, particularly preferably from 1 to 5.

Specific examples of the monomer represented by the formula (3) may be perfluoro(3,6-dioxa-1-heptene), perfluoro(3,6-dioxa-1-octene) and perfluoro(5-methyl-3,6-dioxa-1-nonene).

The content of the TFE units is from 69 to 90 mol %, preferably from 69 to 89 mol %, more preferably from 69 to 80 mol %, particularly preferably from 70 to 75 mol %, to all units of the fluorinated copolymer.

The content of the PAVE units is preferably from 10 to 31 mol %, more preferably from 20 to 31 mol %, particularly preferably from 25 to 30 mol %, to all units of the fluorinated copolymer.

In a case where the fluorinated copolymer has formula (2) units, the content thereof is preferably from 0.03 to 0.5 mol %, particularly preferably from 0.05 to 0.3 mol %, to all units of the fluorinated copolymer.

In a case where the fluorinated copolymer has formula (3) units, the content thereof is preferably from 1 to 21 mol %, particularly preferably from 5 to 11 mol %, to all units of the fluorinated copolymer.

The total of the content of TFE units and the content of PAVE units is preferably from 79 to 100 mol %, particularly preferably from 89 to 100 mol %, to all units of the fluorinated copolymer.

Suitable combinations of the respective units to be contained in the fluorinated copolymer are shown below.

Combination 1: Combination of TFE units and PAVE units (preferably formula (1) units, more preferably PPVE units or PMVE units)

Combination 2: Combination of TFE units, PAVE units (preferably formula (1) units, more preferably PPVE units or PMVE units) and formula (2) units The copolymerization compositions in combinations 1 and 2 are preferably in the following molar ratios. When they are in the following molar ratios, further the mechanical properties, heat resistance, chemical resistance, oil resistance and weather resistance of crosslinked rubber will be excellent.

Combination 1: TFE units/PAVE units=69 to 90/10 to 31 (molar ratio)

Combination 2: TFE units/PAVE units/formula (2) units=69 to 89/10 to 31/0.03 to 0.5 (molar ratio)

The fluorinated copolymer may also have units based on other monomers other than those listed above. Such other monomers may be a fluorinated monomer and a non-fluorinated monomer.

Specific examples of the fluorinated monomer may be vinyl fluoride, pentafluoropropylene, perfluorocyclobutene, and (perfluoroalkyl)ethylenes such as CH$_2$=CHCF$_3$, CH$_2$=CHCF$_2$CF$_3$, CH$_2$=CHCF$_2$CF$_2$CF$_3$, CH$_2$=CHCF$_2$CF$_2$CF$_2$CF$_3$ and CH$_2$=CHCF$_2$CF$_2$CF$_2$CF$_2$CF$_3$.

Specific examples of the non-fluorinated monomer may be α-olefins such as isobutylene and pentene, vinyl ethers such as methyl vinyl ether, ethyl vinyl ether, propyl vinyl ether and butyl vinyl ether, and vinyl esters such as vinyl acetate, vinyl propionate, vinyl butyrate, vinyl caproate and vinyl caprylate.

When the fluorinated copolymer has units based on other monomers, the content thereof is preferably from 0.001 to 2.0 mol %, more preferably from 0.01 to 1.0 mol %, particularly preferably from 0.01 to 0.5 mol %, to all units in the fluorinated copolymer.

As other monomers, monomers having iodine atoms may be used. When a monomer having an iodine atom is copolymerized, it is possible to introduce an iodine atom also into a side chain of the fluorinated copolymer.

Specific examples of the monomer having an iodine atom may be iodoethylene, 4-iodo-3,3,4,4-tetrafluoro-1-butene, 2-iodo-1,1,2,2-tetrafluoro-1-vinyloxyethane, 2-iodoethyl vinyl ether, allyl iodide, 1,1,2,3,3,3-hexafluoro-2-iodo-1-(perfluorovinyloxy)propane, 3,3,4,5,5,5-hexafluoro-4-iodopentene, iodotrifluoroethylene, and 2-iodoperfluoro(ethyl vinyl ether).

When the fluorinated copolymer has units based on a monomer having an iodine atom, the content thereof is preferably from 0.001 to 2.0 mol %, more preferably from 0.01 to 1.0 mol %, particularly preferably from 0.01 to 0.5 mol %, to all units in the fluorinated copolymer.

It is preferred that the fluorinated copolymer has iodine atoms, and it is particularly preferred that it has iodine atoms at the terminals of the fluorinated copolymer (polymer chain). Here, the term "terminals" refers to both of the terminal of the main chain and the terminal of a branched chain, of the fluorinated copolymer.

Iodine atoms may be iodine atoms derived from iodine compounds that function as chain transfer agents as described later, and iodine atoms in units based on monomers having iodine atoms as described above, and they are preferably iodine atoms derived from iodine compounds.

When the fluorinated copolymer has iodine atoms, the content thereof is preferably from 0.01 to 5.0 mass %, more preferably from 0.05 to 2.0 mass %, particularly preferably from 0.05 to 1.0 mass %, to the total mass of the fluorinated copolymer. When the content of iodine atoms is within the above range, the crosslinking reactivity of the fluorinated copolymer will be superior, and the mechanical properties of crosslinked rubber will be superior.

When the fluorinated copolymer has iodine atoms, the mass ratio of the content of iodine atoms to the content of a crosslinking agent (as described later) in the fluorinated copolymer composition (content of iodine atoms/content of crosslinking agent) is preferably from 0.3 to 1.2, more preferably from 0.3 to 1.0, particularly preferably from 0.35 to 0.70. When it is at least the lower limit value in the above range, the crosslinking reaction tends to proceed easily, and when it is at most the upper limit value in the above range, the hardness will be superior.

When the fluorinated copolymer has iodine atoms, the mass ratio of the content of iodine atoms to the content of a crosslinking co-agent (as described later) in the fluorinated copolymer composition (content of iodine atoms/content of crosslinking co-agent) is preferably from 0.3 to 1.2, more preferably from 0.3 to 1.0, particularly preferably from 0.35 to 0.70. When it is at least the lower limit value in the above range, the crosslinking reaction tends to proceed easily, and when it is at most the upper limit value in the above range, the hardness will be superior.

The content of the fluorinated copolymer is preferably from 95 to 99 mass %, more preferably from 96 to 99 mass %, particularly preferably from 97 to 99 mass %, to the total mass of the fluorinated copolymer composition.

(Method for Producing Fluorinated Copolymer)

One example of the method for producing the fluorinated copolymer may be a method of copolymerizing the above-mentioned monomers in the presence of a chain transfer agent and a radical polymerization initiator.

The chain transfer agent is preferably an iodine compound, particularly preferably an iodine compound represented by the formula $RI_2$. In the above formula, R represents an alkylene group or perfluoroalkylene group having preferably at least 3 (more preferably from 3 to 8) carbon atoms.

Specific examples of the iodine compound represented by the formula $RI_2$ may be 1,3-diiodopropane, 1,4-diiodobutane, 1,6-diiodohexane, 1,8-diiodooctane, 1,3-diiodo perfluoropropane, 1,4-diiodoperfluorobutane, 1,6-diiodoperfluorohexane and 1,8-diiodoperfluorooctane.

As the iodine compound, an iodine compound having a perfluoroalkylene group is preferred, and 1,4-diiodoperfluorobutane is particularly preferred.

When the above monomers are copolymerized in the presence of such an iodine compound, iodine atoms can be introduced into the main chain terminal of the fluorinated copolymer. Further, in the present invention, when a fluorinated copolymer having a branched chain is obtainable, iodine atoms can be introduced also to the terminal of this branched chain in the same way. Therefore, the polymer chain terminal having iodine atoms may be the main chain terminal or the branched chain terminal.

As the radical polymerization initiator, a water-soluble polymerization initiator or a redox polymerization initiator is preferred.

Specific examples of the water-soluble polymerization initiator may be persulfates such as ammonium persulfate, sodium persulfate and potassium persulfate, and organic polymerization initiators such as disuccinic acid peroxide and azobisisobutylamidine dihydrochloride, and among them, persulfates are preferred, and ammonium persulfate is more preferred.

As the redox polymerization initiator, a polymerization initiator having a persulfate and a reducing agent combined, may be mentioned. Among them, a polymerization initiator capable of polymerizing each monomer at a polymerization temperature in a range of from 0 to 60° C. is preferred. Specific examples of the persulfate to constitute the redox polymerization initiator may be alkali metal salts of persulfate such as ammonium persulfate, sodium persulfate, potassium persulfate, etc., and ammonium persulfate is preferred. Specific examples of the reducing agent to be combined with the persulfate may be a thiosulfate, a sulfite, a hydrogen sulfite, a pyrosulfite and a hydroxymethanesulfinate, and a hydroxymethanesulfinate is preferred, and sodium hydroxymethanesulfinate is particularly preferred.

With respect to details of the components other than the above to be used in the production of the fluorinated copolymer and the production method, reference may be made to the method described in paragraphs 0019 to 0034 of WO2010/082633.

<Crosslinking Agent>

The crosslinking agent is used to crosslink the fluorinated copolymer. As the crosslinking agent, an organic peroxide is preferred, since the crosslinking reactivity of the fluorinated copolymer will thereby be superior.

Specific examples of the organic peroxide may be dialkyl peroxides, α,α'-bis(tert-butylperoxy)-p-diisopropylbenzene, α,α'-bis(tert-butylperoxy)-m-diisopropylbenzene, benzoyl peroxide, tert-butylperoxybenzene, 2,5-dimethyl-2,5-di(benzoylperoxy)hexane, tert-butyl cumyl peroxide and dicumyl peroxide. Among them, dialkyl peroxides, α,α'-bis (tert-butylperoxy)-p-diisopropylbenzene and α,α'-bis(tert-butylperoxy)-m-diisopropylbenzene are preferred.

Specific examples of the dialkyl peroxides may be 1,1-di(tert-butylperoxy)-3,3,5-trimethylcyclohexane, 2,5-dimethylhexane-2,5-dihydroxy peroxide, tert-butylperoxymaleate, tert-butylperoxyisopropyl carbonate, di-tert-butylperoxide, 2,5-dimethyl-2,5-di(tert-butylperoxy) hexane, and 2,5-dimethyl-2,5-di(tert-butylperoxy)-3-hexine. Among them, dicumyl peroxide and 2,5-dimethyl-2,5-di (tert-butylperoxy)hexane are preferred.

As the crosslinking agent, only one type may be contained, or two or more types may be contained.

In the fluorinated copolymer composition, the content of the crosslinking agent is from 0.03 to 0.7 part by mass, preferably from 0.1 to 0.6 part by mass, particularly preferably from 0.3 to 0.6 parts by mass, to 100 parts by mass of the fluorinated copolymer. When it is at least the lower limit value in the above range, the hardness of crosslinked rubber will be superior, and when it is at most the upper limit value in the above range, the transparency of crosslinked rubber will be superior.

<Crosslinking Co-Agent>

A crosslinking co-agent is used to improve the crosslinking reactivity of the fluorinated copolymer.

The crosslinking co-agent is preferably a compound having at least two reactive functional groups in the same molecule. Specific examples of the reactive functional groups may be carbon-carbon double bond-containing groups, halogen atoms, acid anhydride residues, carboxy groups, amino groups, cyano groups and hydroxy groups. The plurality of reactive functional groups present in the same molecule of the crosslinking co-agent may be the same or different from each other.

Specific examples of the carbon-carbon double bond-containing groups may be alkenyl groups such as vinyl, allyl and methallyl groups, unsaturated acyl groups such as acryloyl and methacryloyl groups, and maleimide groups. As the carbon-carbon double bond-containing groups, $C_{2-4}$ alkenyl groups are preferred, and allyl groups are particularly preferred.

Examples of the crosslinking co-agent may be a compound represented by the following formula (4), triallyl cyanurate, triallyl isocyanurate, trimethallyl isocyanurate, 1,3,5-triacryloylhexahydro-1,3,5-triazine, triallyl trimellitate, m-phenylenediamine bismaleimide, p-quinonedioxime, p,p'-dibenzoylquinonedioxime, dipropargyl terephthalate, diallyl phthalate, N,N',N'',N'-tetraallyl terephthalamide, and vinyl group-containing siloxane oligomers (polymethylvinylsiloxane, polymethylphenylvinylsiloxane, etc.). Among them, the compound represented by the following formula (4), triallyl cyanurate, triallyl isocyanurate and trimethallyl isocyanurate are preferred; the compound represented by the following formula (4) and triallyl isocyanurate are more preferred; and from such a viewpoint that the transparency of crosslinked rubber will be superior, the compound represented by the following formula (4) is particularly preferred.

As the crosslinking co-agent, only one type may be contained, or two or more types may be contained.

The formula (4) is as follows.

$$(CR^{41}R^{42}{=}CR^{43})_2R^{44} \qquad \text{Formula (4)}$$

In the formula (4), $R^{41}$, $R^{42}$ and $R^{43}$ each independently represent a hydrogen atom, a fluorine atom, a $C_{1-5}$ alkyl group or a $C_{1-5}$ fluoroalkyl group, and $R^{44}$ represents a bivalent C1-18 fluorohydrocarbon group or a group having an etheric oxygen atom at a terminal or between carbon-carbon atoms of the fluorohydrocarbon group. A plurality of $R^{41}$, a plurality of $R^{42}$ and a plurality of $R^{43}$ may, respectively, be the same or different.

In a case where $R^{41}$, $R^{42}$ and $R^{43}$ are the alkyl groups or the fluoroalkyl groups, they may be linear or branched, but are preferably linear.

In a case where $R^{41}$, $R^{42}$ and $R^{43}$ are the alkyl groups or the fluoroalkyl groups, the number of carbon atoms therein is from 1 to 5, preferably from 1 to 3, particularly preferably 1 or 2.

From such a viewpoint that the polymerization reactivity of DVE will be superior, it is preferred that all of $R^{41}$, $R^{42}$ and $R^{43}$ are hydrogen atoms.

The fluorohydrocarbon group in $R^{44}$ is preferably a perfluorohydrocarbon group, from such a viewpoint that the heat resistance of a crosslinked rubber product will be superior.

$R^{44}$ may be any of linear, branched or cyclic, but is preferably linear or branched, particularly preferably linear. The number of carbon atoms in $R^{44}$ is from 1 to 18, preferably from 2 to 8, particularly preferably from 3 to 7.

In a case where $R^{44}$ has an etheric oxygen atom, the number of etheric oxygen atoms in $R^{44}$ is preferably from 1 to 6, more preferably from 1 to 3, particularly preferably 1 or 2. In a case where $R^{44}$ has an etheric oxygen atom, it is preferred that the etheric oxygen atom is present at a terminal of $R^{44}$.

As the compound represented by the formula (4), a compound represented by the above-mentioned formula (2) is preferred. Among compounds represented by the formula (2), C3DVE, C4DVE, $CH_2{=}CH(CF_2)_2$ $CH{=}CH_2$, $CH_2{=}CH(CF_2)_4$ $CH{=}CH_2$ and C6DV are preferred, and C6DV is particularly preferred.

In the fluorinated copolymer composition, the content of the crosslinking co-agent is from 0.1 to 2.5 parts by mass, preferably from 0.1 to 2.0 parts by mass, particularly preferably from 0.1 to 1.0 part by mass, to 100 parts by mass of the fluorinated copolymer. When it is at least the lower limit value in the above range, the hardness of crosslinked rubber will be superior, and when it is at most the upper limit value in the above range, the transparency of crosslinked rubber will be superior.

In the fluorinated copolymer composition, the mass ratio of the content of the crosslinking agent to the content of the crosslinking co-agent (content of the crosslinking agent/content of the crosslinking co-agent) is preferably from 0.4 to 7, more preferably from 0.4 to 7.0, further preferably from 0.4 to 5.0, particularly preferably from 0.5 to 2.0. Within the above range, an unreacted crosslinking agent is unlikely to remain, and the crosslinking reaction proceeds well, whereby the transparency will be superior.

In the fluorinated copolymer composition, it is preferred that the total of the contents of the crosslinking agent and the crosslinking co-agent is preferably at most 2.0 parts by mass, more preferably at most 1.8 parts by mass, particularly preferably at most 1.5 parts by mass, to 100 parts by mass of the fluorinated copolymer. When it is at most the above value, the transparency of crosslinked rubber will be superior.

In the fluorinated copolymer composition, the total of the contents of the crosslinking agent and the crosslinking co-agent is preferably at least 0.1 part by mass, particularly preferably at least 0.5 part by mass, to 100 parts by mass of the fluorinated copolymer. When it is at least the above value, the hardness of crosslinked rubber will be superior.

<Other Components>

The fluorinated copolymer composition may contain other components other than those mentioned above to such an extent that the effects of the invention are not impaired. Such other components may be processing aids (e.g. acid acceptors such as fatty acid esters, fatty acid metal salts, etc.), fillers and reinforcing agents (e.g. carbon black, barium sulfate, calcium metasilicate, calcium carbonate, titanium dioxide, silicon dioxide, clay, talc), metal oxides (e.g. bivalent metal oxides such as magnesium oxide, calcium oxide, zinc oxide, lead oxide, etc.), vulcanizing agents, and scorch retardants (e.g. phenolic hydroxy group-containing compounds such as bisphenol A, etc., quinones such as hydroquinone, α-methylstyrene dimers such as 2,4-di(3-isopropylphenyl)-4-methyl-1-pentene, etc.).

Although the fluorinated copolymer composition may contain the filler and reinforcing agent, it is preferred that the fluorinated copolymer composition does not substantially contain the filler and reinforcing agent, from the viewpoint of superior transparency of crosslinked rubber. Here, "the fluorinated copolymer composition does not substantially contain the filler and reinforcing agent" means that in the fluorinated copolymer composition, the total of the contents of the filler and reinforcing agent, is at most 0.1 part by mass, preferably at most 0.01 part by mass, particularly preferably 0 part by mass, to 100 parts by mass of the crosslinked rubber.

In the fluorinated copolymer composition, the total of the contents of components other than the copolymer, i.e. the crosslinking agent, the crosslinking co-agent and other components, is preferably from 0.5 to 2.0 parts by mass, more preferably from 0.5 to 1.8 parts by mass, particularly preferably from 0.5 to 1.2 parts by mass, to 100 parts by mass of the fluorinated copolymer. When it is at least the lower limit value in the above range, the hardness of crosslinked rubber will be superior, and when it is at most the upper limit value in the above range, the transparency of crosslinked rubber will be superior.

As the method for preparing the fluorinated copolymer composition, a method of mixing the above-mentioned respective components may be mentioned. The mixing of the respective components may be carried out by using a mixing device for rubber, such as a roll, kneader, Banbury mixer or extruder.

Further, after obtaining a mixture having the above respective components mixed, the mixture may be molded. That is, the fluorinated copolymer composition may be a molded product. A specific example of the molding method of the mixture may be compression molding, injection molding, extrusion molding, calendar molding, or a method of molding by dipping or coating as dissolved in a solvent.

[Method for Producing Crosslinked Rubber]

Crosslinked rubber is obtainable by crosslinking the fluorinated copolymer in the fluorinated copolymer composition.

As the method for crosslinking the fluorinated copolymer in the fluorinated copolymer composition, a method of heating the fluorinated copolymer composition is preferred.

As a specific example of the crosslinking method by heating, heat press crosslinking, steam crosslinking, or hot air crosslinking may be mentioned, and may be suitably selected for use in consideration of the form and application of the fluorinated copolymer composition.

The heating conditions are preferably at from 100 to 400° C. for from 1 second to 24 hours.

The crosslinked rubber that has been primarily crosslinked by heating the fluorinated copolymer composition may be further heated and secondarily crosslinked. By conducting the secondary crosslinking, it is possible to stabilize or improve the mechanical properties, compression set and other properties of the crosslinked rubber.

Heating conditions at the time of conducting the secondary crosslinking are preferably from 100 to 300° C. for from 30 minutes to 48 hours.

A crosslinking method other than crosslinking by heating the fluorinated copolymer composition, may be a method of crosslinking by irradiating the fluorinated copolymer composition with radiation. Specific examples of the radiation to be irradiated may be electron beams and ultraviolet rays.

<Physical Properties>

Crosslinked rubber of the present invention exhibits high transparency, since it is obtained by using the above-mentioned fluorinated copolymer composition. As an index for showing the transparency of crosslinked rubber, the total light transmittance may be mentioned. The total light transmittance (%) means the transmittance of the light rays including all of the parallel and diffuse components among the light rays transmitted when the test piece is exposed to light.

The total light transmittance of crosslinked rubber is preferably from 70% to 100%, more preferably from 73 to 100%, particularly preferably from 75 to 100%. Crosslinked rubber of the present invention is obtained by using the above-mentioned fluorinated copolymer composition and thus satisfies the above range of the total light transmittance. When the total light transmittance is at least 70%, the transparency can be said to be excellent when crosslinked rubber is observed.

The total light transmittance of crosslinked rubber in the present invention is a value to be measured in accordance with JIS K7361-1:1997 by using a plate-shaped molded product of crosslinked rubber (thickness: 2 mm).

As an index for the crosslinking properties of crosslinked rubber, $M_H$-$M_L$ (hereinafter referred to also as "degree of crosslinking") to be measured by the method in Examples as described later, may be mentioned. It can be said that the higher the numerical value of the degree of crosslinking, the more the crosslinked structure of crosslinked rubber, and the more microcrystalline portions exist in crosslinked rubber. Therefore, when the numerical value of the degree of crosslinking is small, it can be said that the transparency of crosslinked rubber is excellent, and when the numerical value of the degree of crosslinking is large, it can be said that the rubber properties of crosslinked rubber are excellent (for example, the hardness or the tensile strength is high). The degree of crosslinking of crosslinked rubber is preferably from 3 to 50 dNm, more preferably from 3 to 45 dNm, particularly preferably from 5 to 40 dNm. When the degree of crosslinking of crosslinked rubber is within the above range, both rubber properties and transparency can be achieved at a high level.

The tensile strength of crosslinked rubber is preferably from 1 to 50 MPa, particularly preferably from 10 to 35 MPa. When the tensile strength of crosslinked rubber is within the above range, the rubber properties and transparency of crosslinked rubber will be superior.

The 100% modulus of crosslinked rubber is preferably from 0.2 to 5.0 MPa, particularly preferably from 0.5 to 3.5 MPa, from the viewpoint of excellent rubber properties.

The elongation at break of crosslinked rubber is preferably from 100 to 1,000%, particularly preferably from 150 to 600%, from the viewpoint of excellent rubber properties.

The tensile strength, the 100% modulus, and the elongation at break, of crosslinked rubber, are values to be measured in accordance with JIS K6251:2017 by using a sample having a plate-shaped molded product of crosslinked rubber (thickness: 2 mm) punched out by a No. 3 dumbbell.

The hardness (Shore-A) of crosslinked rubber is from 65 to 100, and from the viewpoint of excellent rubber properties, preferably from 65 to 80, particularly preferably from 65 to 75. Crosslinked rubber satisfies the above value of the hardness, since it is obtained by using the above-described fluorinated copolymer composition.

The hardness (Shore-A) of crosslinked rubber is a value to be measured by using a type A durometer in accordance with JIS K6253-3:2012, by using a plate-shaped molded product of crosslinked rubber (thickness: 2 mm).

<Applications>

Crosslinked rubber is suitable as a material for e.g. O-rings, sheets, gaskets, oil seals, diaphragms and V-rings. Further, it is also useful for applications, such as heat-resistant chemical-resistant sealing materials, heat-resistant oil-resistant sealing materials, electric wire coating materials, sealing materials for semiconductor equipment, corrosion-resistant rubber paints, sealing materials for urea-resistant grease, etc., rubber paints, adhesive rubber, hoses, tubes, calendar sheets (rolls), sponges, rubber rolls, members for oil drilling, heat dissipating sheets, solution crosslinkers, rubber sponges, bearing seals (urea resistant grease, etc.), lining (chemical resistant), automotive insulating sheets, insulating sheets for electronic equipment, rubber bands for watches, packings for endoscope (amine resistant), bellows hoses (processed from calendar sheets), packings/valves for water heaters, fenders (marine civil engineering, ships), fibers and non-woven fabrics (protective clothing, etc.), sealing materials for substrate, rubber gloves, stators for uniaxial eccentric screw pumps, parts for urea SCR systems, vibration isolators, damping agents, sealants, additives to other materials, and toys.

Crosslinked rubber is excellent in transparency and thus is particularly suitable for applications where visibility from the outside is required. A specific example of the application where transparency is required, may be a sealing material for semiconductor production devices.

EXAMPLES

Hereinafter, the present invention will be described in detail with reference to Examples. Ex. 1 to Ex. 3 are Examples of the present invention, and Ex. 4 to Ex. 9 are Comparative Examples. However, the present invention is not limited to these Examples. The blend amounts of the respective components in Table given later are based on mass.

[Measurement of Copolymerization Composition]

The contents of the respective units in a copolymer were calculated by the nuclear magnetic resonance (NMR) analysis.

Further, the content of iodine atoms in a copolymer was calculated by a device having an automatic sample combustion system pretreatment system for ion chromatography (manufactured by Mitsubishi Chemical Analytech, AQF-100 model) and an ion chromatograph combined.

[Total Light Transmittance]

The total light transmittance was measured by using a haze meter (manufactured by Nippon Denshoku Industries Co., Ltd., NDH5000) in accordance with JIS K7361-1:1997 by using a plate-shaped molded product of crosslinked rubber (thickness: 2 mm).

If the total light transmittance is at least 70%, the crosslinked rubber can be said to be excellent in transparency.

A case where the total light transmittance is at least 75% was evaluated to be "⊚", a case where the total light transmittance is at least 70% and less than 75% was evaluated to be "603 ", and a case where the total light transmittance is less than 70% was evaluated to be "x".

[Degree of crosslinking]

The components and amounts shown in Table 1 given later were formulated and kneaded by two rolls for 10 minutes at room temperature to obtain a mixed composition.

With respect to the obtained composition, the crosslinking properties were measured by using a crosslinking property measuring instrument (manufactured by ALPHA Technologies, Ltd., product name "RPA2000") under conditions of at 150° C. for 20 minutes with an amplitude of 3 degrees.

The measured $M_H$ indicates the maximum torque value, $M_L$ indicates the minimum torque value, and $M_H$-$M_L$ ($M_H$ minus $M_L$) indicates the degree of crosslinking (unit: dNm).

[Tensile Strength, 100% Modulus, Elongation at Break, Hardness]

The composition obtained in the same way as the measurement of the degree of crosslinking was heat-pressed (primary crosslinking) under the crosslinking conditions shown in Table given later to obtain a crosslinked rubber sheet having a thickness of 2 mm. The obtained crosslinked rubber sheet was punched out by a No. 3 dumbbell to prepare measurement samples.

Using the obtained measurement samples, the tensile strength, the 100% modulus and the elongation at break were measured in accordance with JIS K6251:2017.

The tensile strength, the 100% modulus and the elongation at break were measured by using a tensile tester with data processing (Quick Reader) TS-2530 (manufactured by Ueshima Seisakusho Co., Ltd.).

If the tensile strength is at least 1 MPa, the crosslinked rubber can be said to be excellent in tensile strength.

Further, by using the obtained measurement samples, the hardness (Shore-A) was measured by using Digitest Shore-A (manufactured by H. Bareiss) in accordance with JIS K6253-3:2012.

If the hardness is at least 65, crosslinked rubber can be said to be excellent in hardness.

[Production of Fluorinated Copolymers]

As shown below, copolymers 1 to 4 being fluorinated copolymers were produced.

(Copolymer 1)

A stainless steel pressure resistant reactor equipped with anchor blades and having an internal volume of 20L, was deaerated, then 8.2L of ultrapure water, 733 g of a 30 mass % solution of $C_2F_5OCF_2CF_2OCF_2COONH_4$, 10.0 g of C3DVE and 15.9 g of a 5 mass % aqueous solution of disodium hydrogen phosphate 12 hydrate, were charged, and the gas phase was substituted with nitrogen. While stirring at a rate of 375 rpm by using the anchor blades, when the internal temperature became 80° C., 198 g of TFE and 454 g of PMVE were injected into the reactor. The inner pressure of the reactor was 0.90 MPa (gauge). 40 mL of a 1 mass % aqueous solution of ammonium persulfate was added to initiate polymerization. When the added ratio of monomers (hereinafter referred to as initial monomers) injected before the initiation of polymerization is represented by a molar ratio, TFE:PMVE:C3DVE=41.74:57.64:0.61.

At the time when the inner pressure of the reactor decreased to 0.89 MPa (gauge) along with the progress of polymerization, TFE was injected to raise the inner pressure of the reactor to 0.90 MPa (gauge). This operation was repeated, and every time when 80 g of TFE was injected, 62 g of PMVE was also injected. Further, 7.0 g of 1,4-diiodoperfluorobutane was injected from an ample tube into the reactor together with 50 mL of ultrapure water, at the time when 60 g of TFE was injected.

At the time when the total added mass of TFE reached 1,200 g, addition of monomers (hereinafter referred to as "post addition monomers") injected after the initiation of polymerization, was terminated, and the inner temperature of the reactor was cooled to 10° C. to terminate the polymerization reaction thereby to obtain a latex containing a fluorinated copolymer. The polymerization time was 360 minutes. Further, the total added mass of the post addition monomers was such that TFE was 1,200 g and PMVE was 868 g, and when this is converted to a molar ratio, TFE:PMVE=68:32.

Nitric acid (Kanto Chemical Co., Inc., special grade) was dissolved in ultrapure water to prepare a 3 mass % aqueous solution of nitric acid. The latex was added to the nitric acid aqueous solution in a container made of TFE/perfluoro(alkyl vinyl ether) copolymer (PFA) to precipitate the fluorinated copolymer. The amount of the nitric acid aqueous solution to 100 parts by mass of the fluorinated copolymer in the latex, was 150 parts by mass.

The precipitated fluorinated copolymer was recovered by filtration, and put into ultrapure water in the container made of PFA, followed by stirring at 200 rpm for 30 minutes for washing. The amount of ultrapure water to 100 parts by mass of the fluorinated copolymer was 100 parts by mass. The above washing was repeated 10 times.

The washed fluorinated copolymer was recovered by filtration, and vacuum-dried at 50° C. under 10 kPa to obtain copolymer 1. The molar ratio of the respective units in the copolymer 1 was TFE units:PMVE units:C3DVE units=71.40:28.43:0.17, and the content of iodine atoms was 0.10 mass %.

(Copolymer 2)

Copolymer 2 was produced in accordance with the production method for copolymer 1 except that at the time of precipitating the latex, instead of the nitric acid aqueous solution, a 5 mass % aqueous solution of aluminum potassium sulfate was used. The amount of the aluminum potassium sulfate aqueous solution to 100 parts by mass of the fluorinated copolymer in the latex, was 150 parts by mass.

The precipitated fluorinated copolymer was recovered by filtration and washed in the same manner as in Ex. 1.

The washed fluorinated copolymer was recovered by filtration and dried in the same manner as in Ex. 1 to obtain copolymer 2. The molar ratio of the respective units in the copolymer 2 was TFE units:PMVE units:C3DVE units=71.43:28.40:0.17, and the content of iodine atoms was 0.10 mass %.

(Copolymer 3)

Copolymer 3 was produced in accordance with the production method for copolymer 1 except that instead of 10 g of C3DVE, 6 g of C6DV was used. When the added ratio of initial monomers was represented by a molar ratio, TFE:PMVE:C6DV=41.7:57.6:0.61. The molar ratio of the respective units in the copolymer 3 was TFE units:PMVE units:C6DV units=71.54:28.40:0.16, and the content of iodine atoms was 0.10 mass %.

(Compound 4)

Copolymer 4 was produced with reference to the method in Example 1 in WO2010/082633 except that PBDVE was changed to C3DVE.

The copolymer composition of copolymer 4 was TFE units/PMVE units:C3DVE units=65.9/34.0:0.1 (molar ratio), and the content of iodine atoms was 0.20 mass %.

Ex. 1 to Ex. 9

The components and blending amounts were formulated as shown in Table 1, and kneaded by two rolls for 10 minutes under room temperature to obtain mixed compositions. The obtained compositions were heat-pressed (primary crosslinking) under the crosslinking conditions shown in Table given later to obtain crosslinked rubbers (crosslinked rubber sheets) of Ex. 1 to Ex. 9 in sheet form.

Using the obtained compositions and crosslinked rubbers, the above-mentioned various properties were measured. The measurement results are shown in Table 1.

A summary of each of the components listed in Table 1, excluding the copolymers, is given below.

Perkadox 14: Trade name, manufactured by Kayaku Akzo Corporation, crosslinking agent (organic peroxide), α,α'-bis(tert-butylperoxy)-p-diisopropylbenzene Perhexa 25B: Trade name, manufactured by Nippon Oil & Fat, 2,5-dimethyl-2,5-di(tert-butylperoxy) hexane, crosslinking agent (organic peroxide)

TAIC: Trade name, manufactured by Mitsubishi Chemical Corporation, triallyl isocyanurate, crosslinking co-agent Ca stearate: Calcium stearate, acid acceptor Aerosil R8200: Trade name, manufactured by Nippon Aerosil Co., Ltd., silica, filler and reinforcing agent Aerosil R972V: Trade name, manufactured by Nippon Aerosil Co., Ltd., silica, filler and reinforcing agent

TABLE 1

|  |  | Ex. 1 | Ex. 2 | Ex. 3 | Ex. 4 | Ex. 5 | Ex. 6 | Ex. 7 | Ex. 8 | Ex. 9 |
| --- | --- | --- | --- | --- | --- | --- | --- | --- | --- | --- |
| Fluorinated copolymer | Type | CP* 1 | CP* 2 | CP* 3 | CP* 4 | CP* 4 | CP* 3 | CP* 4 | CP* 4 | CP* 4 |
|  | Content (parts by mass) | 100 | 100 | 100 | 100 | 100 | 100 | 100 | 100 | 100 |
| Crosslinking agent | Perhexa 25B (parts by mass) | 0.5 | 0.5 | 0.5 | 0 | 0 | 2 | 1 | 1 | 0.5 |
|  | Perkadox 14 (parts by mass) | 0 | 0 | 0 | 1.0 | 0.2 | 0 | 0 | 0 | 0 |
| Crosslinking co-agent | TAIC (parts by mass) | 0.5 | 0.5 | 0.5 | 3.0 | 3.0 | 3.0 | 1.8 | 1.8 | 0.5 |
| Acid acceptor | Ca stearate (parts by mass) | 0 | 0 | 0 | 1.0 | 0 | 0 | 0 | 0 | 0 |
| Filler and reinforcing agent | Aerosil R8200 (parts by mass) | 0 | 0 | 0 | 0 | 0 | 0 | 12 | 0 | 0 |
|  | Aerosil R972V (parts by mass) | 0 | 0 | 0 | 0 | 0 | 0 | 0 | 12 | 0 |

TABLE 1-continued

|  |  | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|---|
| Total of contents of crosslinking agent and crosslinking co-agent (parts by mass) | | 1.0 | 1.0 | 1.0 | 4.0 | 3.2 | 4.5 | 2.8 | 2.8 | 1.0 |
| Total of components other than fluorinated copolymer (parts by mass) | | 1.0 | 1.0 | 1.0 | 5.0 | 3.2 | 4.5 | 14.8 | 14.8 | 1.0 |
| Content of crosslinking agent/ content of crosslinking co-agent | | 1.0 | 1.0 | 1.0 | 0.33 | 0.05 | 0.50 | 0.56 | 0.56 | 1.0 |
| Content of iodine atoms/ content of crosslinking agent | | 0.2 | 0.2 | 0.2 | 0.26 | 1.33 | 0.07 | 0.26 | 0.26 | 0.3 |
| Content of iodine atoms/ content of crosslinking co-agent | | 0.2 | 0.2 | 0.2 | 0.07 | 0.07 | 0.03 | 0.07 | 0.07 | 0.07 |
| Crosslinking conditions | | 150° C. 20 minutes | | | | | | | | |
| Physical properties | Total light transmittance | ⊚ | ⊚ | ⊚ | X | X | X | X | X | ⊚ |
| | Degree of crosslinking (MH-ML) (dNm) | 23 | 22.7 | 23 | 120 | 83 | 114 | 83 | 83 | 53 |
| | Hardness | 71 | 71 | 70 | 75 | 52 | 77 | 80 | 82 | 57 |
| | Tensile strength (MPa) | 29.5 | 30.1 | 29.4 | 26.5 | 21.8 | 33.4 | 26.5 | 27.1 | 23.2 |
| | 100% modulus | 3.0 | 3.1 | 3.0 | 8.2 | 2.6 | 4.2 | 7.8 | 10.5 | 1.4 |
| | Elongation at break (%) | 221 | 210 | 211 | 200 | 198 | 176 | 205 | 184 | 250 |

CP*: Copolymer

As shown in Ex. 1 to Ex. 3 in Table 1, it has been confirmed that in a case where by using a composition comprising a fluorinated copolymer wherein the content of TFE units to all units in the fluorinated copolymer was from 69 to 90 mol %, a crosslinking agent and a crosslinking co-agent, the content of the crosslinking agent was from 0.03 to 0.7 part by mass to 100 parts by mass of the fluorinated copolymer, and the content of the crosslinking co-agent was from 0.1 to 2.5 parts by mass to 100 parts by mass of the fluorinated copolymer, the obtainable crosslinked rubber was excellent in transparency (total light transmittance is at least 70%) and excellent also in hardness (hardness is at least 65).

Whereas, as shown in Ex. 4, in a case where a composition was used in which by using a fluorinated copolymer wherein the content of TFE units to all units in the fluorinated copolymer was less than 69 mol %, the content of the crosslinking agent in the composition was more than 0.7 part by mass to 100 parts by mass of the fluorinated copolymer, and the content of the crosslinking co-agent in the composition was more than 2.5 parts by mass to 100 parts by mass of the fluorinated copolymer, the obtainable crosslinked rubber was inferior in transparency although it was excellent in hardness.

Further, as shown in Ex. 5, in a case where a composition was used in which by using a fluorinated copolymer wherein the content of TFE units to all units in the fluorinated copolymer was less than 69 mol %, the content of the crosslinking agent in the composition was from 0.03 to 0.7 part by mass to 100 parts by mass of the fluorinated copolymer, but the content of the crosslinking co-agent was more than 2.5 parts by mass to 100 parts by mass of the fluorinated copolymer, the obtainable crosslinked rubber was inferior in hardness and in transparency.

Further, as shown in Ex. 6, in a case where a composition was used in which the content of the crosslinking agent in the composition was more than 0.7 part by mass to 100 parts by mass of the fluorinated copolymer, and the content of the crosslinking co-agent was more than 2.5 parts by mass to 100 parts by mass of the fluorinated copolymer, the obtainable crosslinked rubber was inferior in transparency although it was excellent in hardness.

Further, as shown in Ex. 7 and Ex.8, in a case where a composition was used in which by using a fluorinated copolymer wherein the content of TFE units to all units in the fluorinated copolymer was less than 69 mol %, the content of the crosslinking co-agent in the composition was from 0.1 to 2.5 parts by mass to 100 parts by mass of the fluorinated copolymer, but the content of the crosslinking agent in the composition was more than 0.7 part by mass to 100 parts by mass of the fluorinated copolymer, the obtainable crosslinked rubber was inferior in transparency although it was excellent in hardness.

Further, as shown in Ex. 9, in a case where a composition was used in which by using a fluorinated copolymer wherein the content of TFE units to all units in the fluorinated copolymer was less than 69 mol %, the content of the crosslinking co-agent in the composition was from 0.1 to 2.5 parts by mass to 100 parts by mass of the fluorinated copolymer, and the content of the crosslinking agent was from 0.03 to 0.7 part by mass to 100 parts by mass of the fluorinated copolymer, the obtainable crosslinked rubber was inferior in hardness although it was excellent in transparency.

This application is a continuation of PCT Application No. PCT/JP2020/009647, filed on Mar. 6, 2020, which is based upon and claims the benefit of priority from Japanese Patent Application No. 2019-042729 filed on Mar. 8, 2019, Japanese Patent Application No. 2019-171600 filed on Sep. 20, 2019 and Japanese Patent Application No. 2019-192748 filed on Oct. 23, 2019. The contents of those applications are incorporated herein by reference in their entireties.

What is claimed is:

1. A fluorinated copolymer composition, comprising:
   a crosslinking agent;
   a crosslinking co-agent; and
   a fluorinated copolymer having units based on tetrafluoroethylene, units based on a perfluoro (alkyl vinyl ether), and units based on formula (2), $(CR^1R^2=CR^3)_aR^4$ where each of $R^1$, $R^2$ and $R^3$ independently is a hydrogen atom, a fluorine atom or a methyl group, a represents an integer of from 2 to 6, and $R^4$ is an a-valent $C_{1-10}$ perfluorohydrocarbon group or a group having an etheric oxygen atom at a terminal or between carbon-carbon atoms of the perfluorohydrocarbon group,
   wherein in the fluorinated copolymer, a content of the units based on tetrafluoroethylene is from 69 to 90 mol % based on a total number of moles of units of the fluorinated copolymer, a content of the crosslinking agent is from 0.03 to 0.7 part by mass to 100 parts by mass of the fluorinated copolymer, a content of the crosslinking co-agent is from 0.1 to 2.5 parts by mass to 100 parts by mass of the fluorinated copolymer, and a content of the units based on the formula (2) is from 0.03 to 0.5 mol % based on a total number of moles of units of the fluorinated copolymer.

2. The fluorinated copolymer composition according to claim 1, wherein a mass ratio of the content of the crosslinking agent to the content of the crosslinking co-agent is from 0.4 to 7.

3. The fluorinated copolymer composition according to claim 1, wherein a total of the contents of the crosslinking agent and the crosslinking co-agent is at most 2.0 parts by mass to 100 parts by mass of the fluorinated copolymer.

4. The fluorinated copolymer composition according to claim 1, wherein a total of contents of components other than the fluorinated copolymer is from 0.5 to 2.0 parts by mass to 100 parts by mass of the fluorinated copolymer.

5. The fluorinated copolymer composition according to claim 1, wherein the fluorinated copolymer comprises iodine atoms, and a mass ratio of a content of iodine atoms to the content of the crosslinking co-agent is from 0.3 to 1.2.

6. The fluorinated copolymer composition according to claim 5, wherein a total of the contents of the crosslinking agent and the crosslinking co-agent is at most 2.0 parts by mass to 100 parts by mass of the fluorinated copolymer.

7. The fluorinated copolymer composition according to claim 1, wherein the fluorinated copolymer comprises iodine atoms, and a mass ratio of a content of iodine atoms to the content of the crosslinking agent is from 0.3 to 1.2.

8. The fluorinated copolymer composition according to claim 7, wherein the fluorinated copolymer comprises iodine atoms, and a mass ratio of a content of iodine atoms to the content of the crosslinking co-agent is from 0.3 to 1.2.

9. The fluorinated copolymer composition according to claim 7, wherein a mass ratio of the content of the crosslinking agent to the content of the crosslinking co-agent is from 0.4 to 7.

10. The fluorinated copolymer composition according to claim 7, wherein a total of the contents of the crosslinking agent and the crosslinking co-agent is at most 2.0 parts by mass to 100 parts by mass of the fluorinated copolymer.

11. The fluorinated copolymer composition according to claim 7, wherein a total of contents of components other than the fluorinated copolymer is from 0.5 to 2.0 parts by mass to 100 parts by mass of the fluorinated copolymer.

12. A crosslinked rubber, comprising:
the fluorinated copolymer composition of claim 1 crosslinked.

* * * * *